United States Patent Office 2,796,117
Patented June 18, 1957

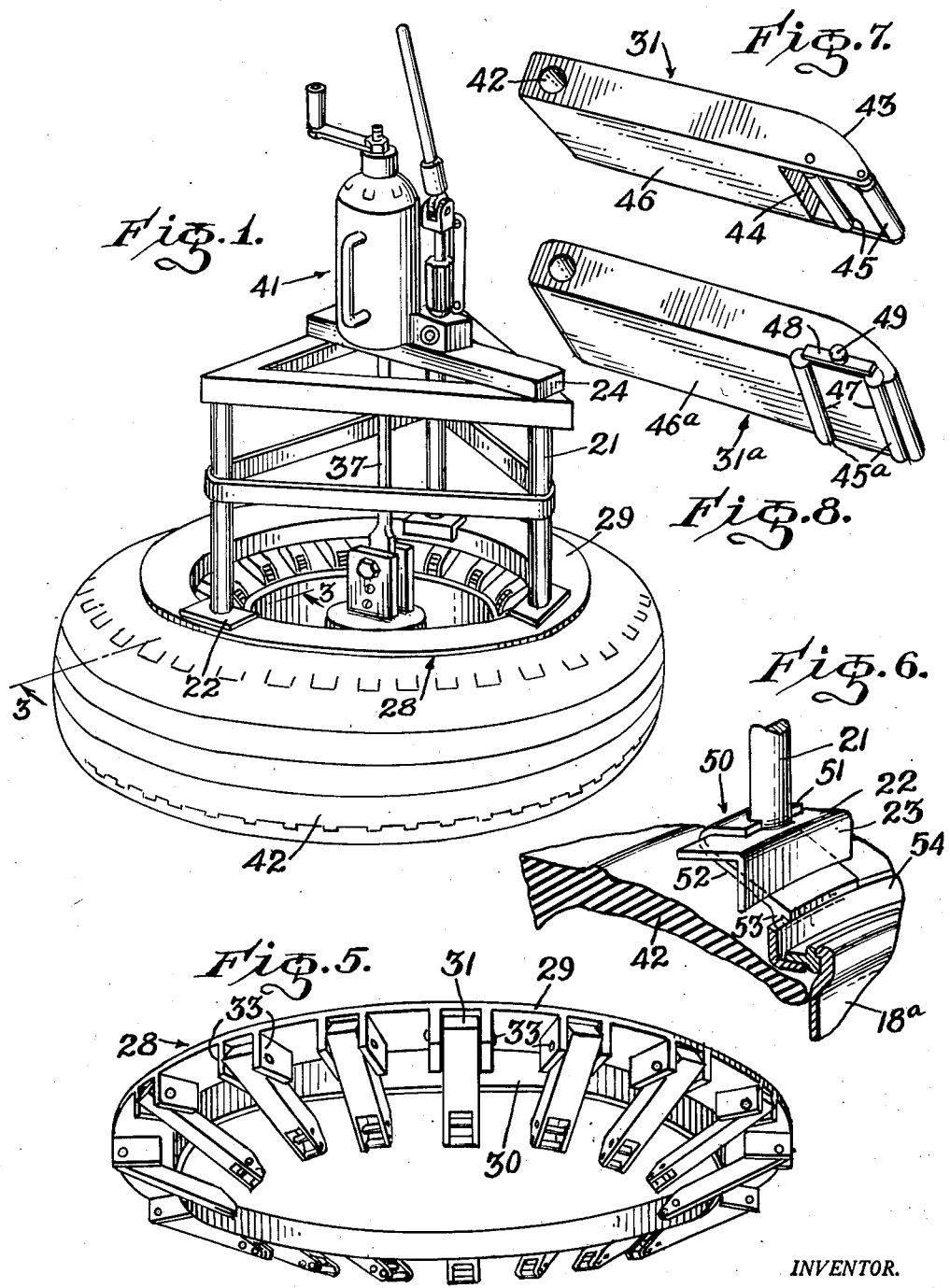

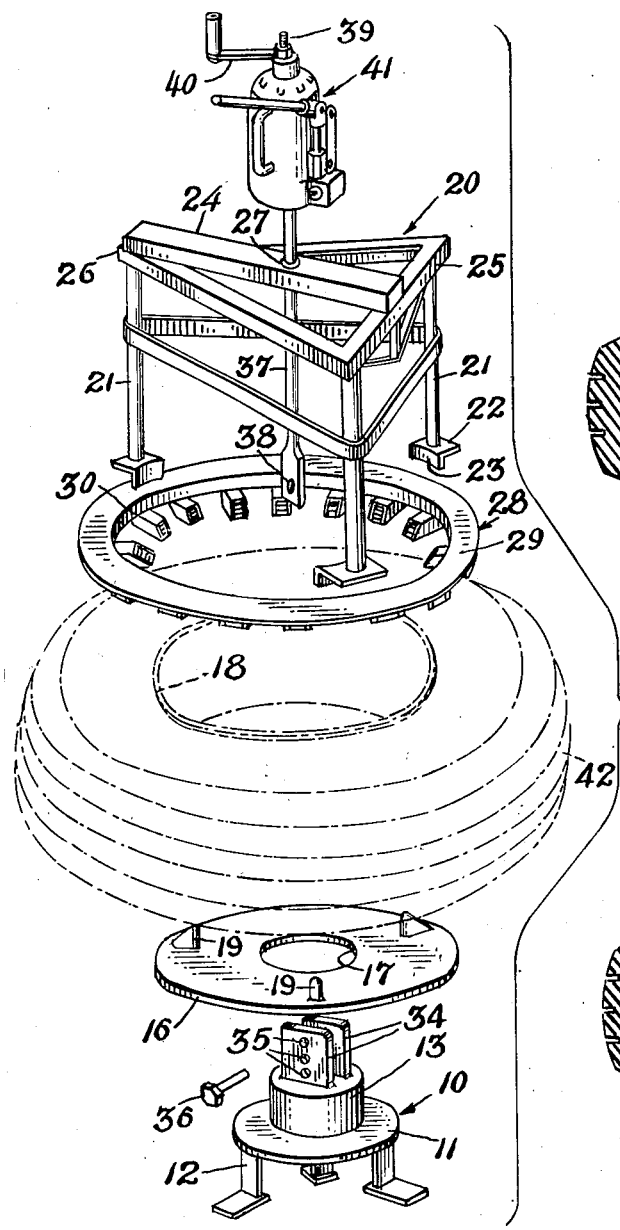
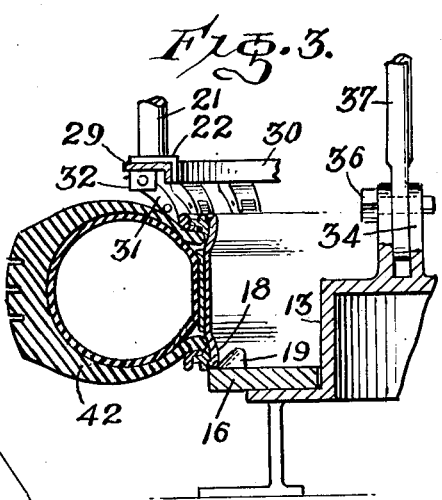
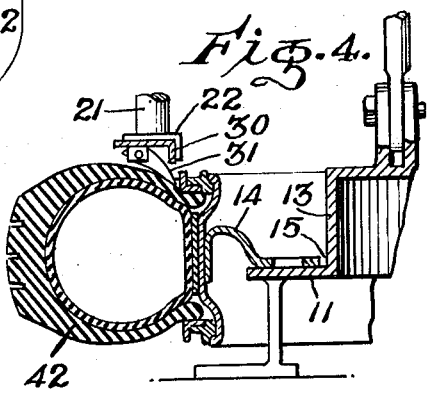

2,796,117

TIRE REMOVING DEVICE WITH CIRCUMFERENTIALLY DISTRIBUTED PIVOTED THRUST MEMBERS

Martin Pientkewic, Vulcan, Mich.

Application October 19, 1954, Serial No. 463,125

2 Claims. (Cl. 157—1.2)

This invention relates to devices or apparatus to remove pneumatic tires from their rims or wheels, and is particularly adaptable to relatively heavy or truck tires.

An object of the invention is the provision of certain new and useful improvements in such devices and more particularly in such a tire removing device as disclosed in my co-pending application Serial No. 354,000, filed May 11, 1953, now Patent No. 2,742,959, whereby the ease and facility of the tire removal operation are enhanced.

Another object of the invention is the provision of an improved tire removal device of the type above-mentioned, which is simple in construction and operation and very efficient in use.

The above broad as well as additional and more specific objects will be clarified in the following description wherein characters of reference refer to like-numbered parts in the accompanying drawings. It is to be noted that the drawings are intended solely for the purpose of illustration and that is therefore neither desired nor intended to limit the invention necessarily to any or all of the exact details of construction shown except insofar as they may be deemed essential to the invention.

Referring briefly to the drawings, Fig. 1 is a perspective view showing the improved tire removing device applied to a tire and ready for the removal operation.

Fig. 2 is an exploded perspective view of the device, showing also the tire on its rim in phantom, with the various parts of the device ready to be brought together ready for the removal operation.

Fig. 3 is a sectional view taken on the line 3—3 of Fig. 1.

Fig. 4 is a fragmentary sectional view similar to Fig. 3 showing, however, the use of the support base without the adapter plate in cases where the tire is mounted directly on the wheel.

Fig. 5 is an inverted perspective view of the press wheel forming a part of the device.

Fig. 6 is a fragmentary perspective view, partly in section, showing the application of the device in pressing the lock ring loose from the rim.

Fig. 7 is an enlarged bottom perspective view of one of the fingers on the press wheel.

Fig. 8 is a similar view of a modified form of the said finger.

Referring in detail to the drawings, the numeral 10 indicates the support base of the device, comprising an annular platform 11 positioned at a suitable elevation above the floor on legs 12 and having an axial hub 13 extending upward therefrom. In case the tire to be removed is mounted directly on the wheel of the vehicle, which is shown merely by way of example at 14 in Fig. 4, the wheel is supported on the platform 11 in the manner shown with the hub 13 passing through the axial passage 15 through the wheel. An annular adapter plate 16 is used in case the tire rim comes off the wheel with the tire, to support the rim in the manner illustrated in Fig. 3, with the hub 13 of the base 10 passing through the axial opening 17 of the adapter plate. Further, to properly position the tire rim, shown at 18, closely adjacent the circumferential edge of the plate 16 and to prevent it from slipping on the plate, three or more circumferentially equidistant prongs 19 are provided integral with the plate.

A frame 20, having substantially the conformation of an equilateral triangle in plan view, has three legs 21 extending from the apices of the triangle, and rigid with the lower extremity of each leg is an L-shaped foot having a concavely shaped apron extending downward from the inner edge thereof, shown respectively at 22 and 23. A cross-member 24 is supported on top of the frame 20, extending from the midpoint of one side 25 of the frame or triangle to the opposite apex 26. An opening 27 extends through the member 24 in axial alignment with an imaginary circle drawn through the feet 22.

A separate press ring or wheel 28 is provided, comprising a horizontal top ring 29 and an internal depending flange 30, the diameter of the latter being slightly in excess of that of the tire rim 18. A relatively large number of closely and equidistantly spaced fingers 31 are pivotally suspended between ears 32 on the underside of the ring 29 on pins 33 and they all extend radially inward and downward. The pivots 33 of the fingers are positioned near the radially outward ends of the latter, substantially as shown, so that, when freely suspended, the rear ends, i. e., the radially outward ends, of the fingers contact the undersurface of the ring 29, whence, as above stated, the fingers normally extend radially inward and downward. It is to be noted, however, that upon upward pressure applied to the radially inward ends of the fingers, they are free to swing through an arc, which is small as shown in Fig. 3, until stopped by the flange 30.

The hub 13 of the base 10 has two spaced upstanding members 34 provided with vertically spaced and horizontally aligned holes 35, any aligned pair of which is adapted to receive a pin 36. A rod 37 extends downward through the opening 27 in the member 24 and has an opening 38 in its lower end, the latter being adapted to be positioned between the members 34 and, with the pin 36 passing through the rod opening 38, the rod is secured to the base 10.

The upper end or portion of the rod 37 is threaded, as at 39, and a crank 40 is threaded thereon, so that upon turning of the crank the rod will tend to rise or descend with respect to the member 24. Since, in the operation of the device as will presently be described, considerable force must be applied to tend to lift the rod, a hydraulic lift or jack, indicated merely by way of example at 41, may be used in association with the rod to provide the necessary force.

In use, assuming that it is desired to remove the tire 42 from the rim 18, the device is set up with respect to the tire as indicated in Fig. 2 and as shown in Fig. 1. The feet 22 are adapted to rest on the ring 29 after the press wheel 28 has been positioned on the tire with the radially inward tips of the fingers 31 arranged around the rim 18. Upon exertion of the upward force on the rod 37, the legs 21 tend to and do urge the ring 29 and of course also the flange 30 downward. The latter engages the fingers 31 and forces their ends downward against the tire bead, thus loosening the latter from the rim, in an obvious manner. The large number of fingers 31 assures an equally distributed force against the tire and thus an even loosening of the tire from the rim. The operation of the device is of course similar when removing a tire from the wheel, as shown in Fig. 4.

The fingers 31 are exemplified in Fig. 7, showing the pivot opening 42 through which the pivot pin 33 passes. The finger has a uniform thickness throughout the greater portion of its length except that it is rounded at its outer end or tip, as shown at 43, and is moreover provided with a cut-out 44 at that end in which two longitudinally spaced rollers 45 are supported which project slightly from the plane of the flat undersurface 46 of the finger. These rollers facilitate movement of the finger on the tire with a minimum of friction. A modified provision of rollers on the tip of the finger is shown in Fig. 8, wherein the finger 31a is identical to the finger 31 except that it is of solid construction at its tip instead of having the cut-out 44. However, spaced transverse cylindrical grooves 47 are provided in which the rollers 45a register loosely. A strap 48 secured intermediate its length to the side of the finger with its ends extending at least part way into the ends of the grooves 47, prevents the rollers from falling out of the ends of the grooves. The grooves 47 are so positioned, with their axes parallel with the underside 46a of the finger, that the plane of the underside provides a chord drawn through the cylinder defined by the groove, thus permitting the rollers to project below the surface 46a.

Fig. 6 illustrates how the lock rim may be pressed loose, where the tire mounting assembly of the rim is provided with the same. An angle-shaped shoe 50 comprising a yoke 51 engaging about the leg 21 and seating on the foot 22, and an angularly and downwardly extending arm 52 extending around the back edge of the foot and under and beyond the apron 23, is used for this purpose. The lower extremity of the arm 52 is provided with a longitudinal groove 53 which engages the rim of the lock ring 54. Upon the exertion of downward pressure on the feet 21, the shoes 50 obviously press the ring 54 downward to loosen the same, the interengagement of the ring with the grooved end 53 of the shoe preventing the latter from slipping over or under the ring.

Obviously, modifications in form or structure may be made without departing from the spirit or scope of the invention.

I claim:

1. A device of the class described for loosening a tire from the rim on which it is mounted, comprising a base having an annular platform thereon and a hub extending upward axially through the platform, an upright frame including a horizontal top portion and a plurality of equidistantly spaced legs extending therefrom, said legs being arranged in an imaginary circle having a diameter slightly larger than the diameter of said rim, said frame having a cross-member on said top portion, said cross-member having an opening therethrough in alignment with the axis of said circle, a vertical rod having one end releasably secured to said hub and the other end extending through said opening, means for urging said rod upward through said opening, said tire being adapted to be positioned on said platform coaxial with said hub, said frame being positioned on the tire with said circle coaxial with said rim, said legs having feet positioned radially outward from said rim, a horizontal ring having substantially the same internal diameter as said circle, said ring having a depending internal flange, said feet having depending aprons extendng from the radially inward ends thereof and positioned against said flange, said ring having a plurality of circumferentially spaced radial fingers pivotally secured near but spaced from their rear ends to the underside of the ring and extending radially inward under said flange, said fingers each having a main body portion and a tapering tip engageable with the tire adjacent the rim, said flange pressing on the fingers to loosen the tire from the rim upon actuation of said means for urging said rod upward, each of said fingers having at least one transverse roller on the underside of said tapering tip thereof.

2. The device set forth in claim 1, the length of each of said fingers between the tip and the pivot axis thereof substantially exceeding the distance from the pivot axis to the other end of the finger whereby said tip ends of the fingers when said ring is horizontal tend by gravity to rotate downward, said other end of the finger contacting the undersurface of said ring after downward rotation of the finger through a small arc thereby limiting the extent of said downward rotation and normally positioning said fingers sloping downward in a radially inward direction.

References Cited in the file of this patent

UNITED STATES PATENTS

| | | |
|---|---|---|
| 1,564,496 | Staugaard | Dec. 8, 1925 |
| 2,406,996 | Colley | Sept. 3, 1946 |
| 2,442,714 | Stack | June 1, 1948 |
| 2,495,118 | McCollister | Jan. 17, 1950 |
| 2,508,069 | Lowry | May 16, 1950 |
| 2,580,926 | Johnson et al. | Jan. 1, 1952 |
| 2,595,258 | Hildred | May 6, 1952 |